Jan. 15, 1952 T. W. HALLERBERG 2,582,483
PRESSURE SENSITIVE SWITCH
Filed March 13, 1947 2 SHEETS—SHEET 1
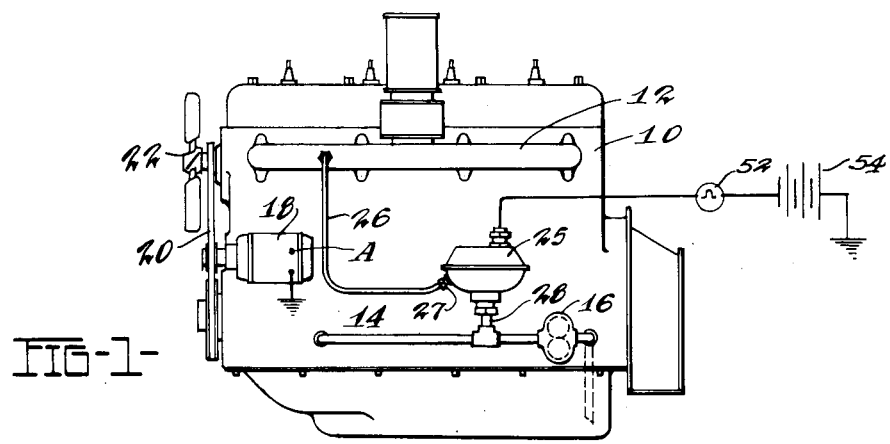
FIG-1-
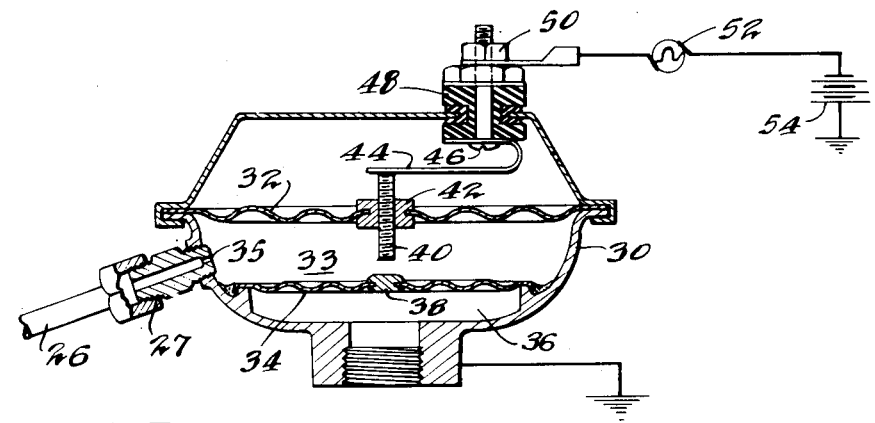
FIG-2-
INVENTOR.
THEODORE W. HALLERBERG
BY
ATTYS.

Jan. 15, 1952 T. W. HALLERBERG 2,582,483
PRESSURE SENSITIVE SWITCH
Filed March 13, 1947 2 SHEETS—SHEET 2
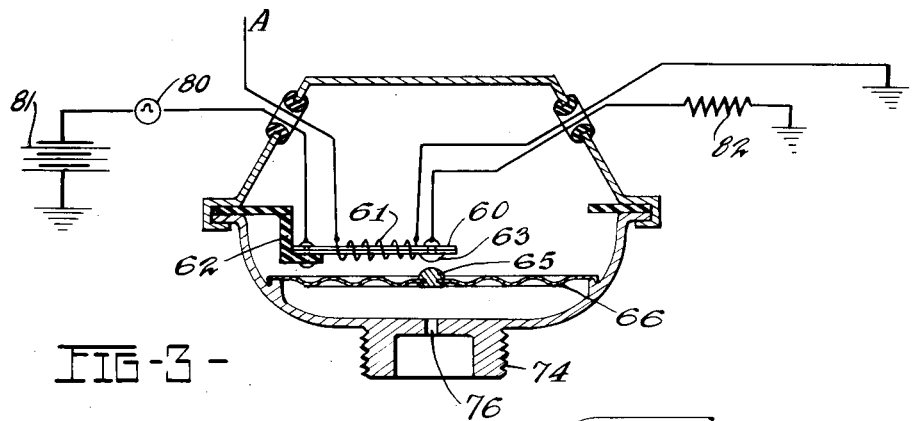
FIG-3-
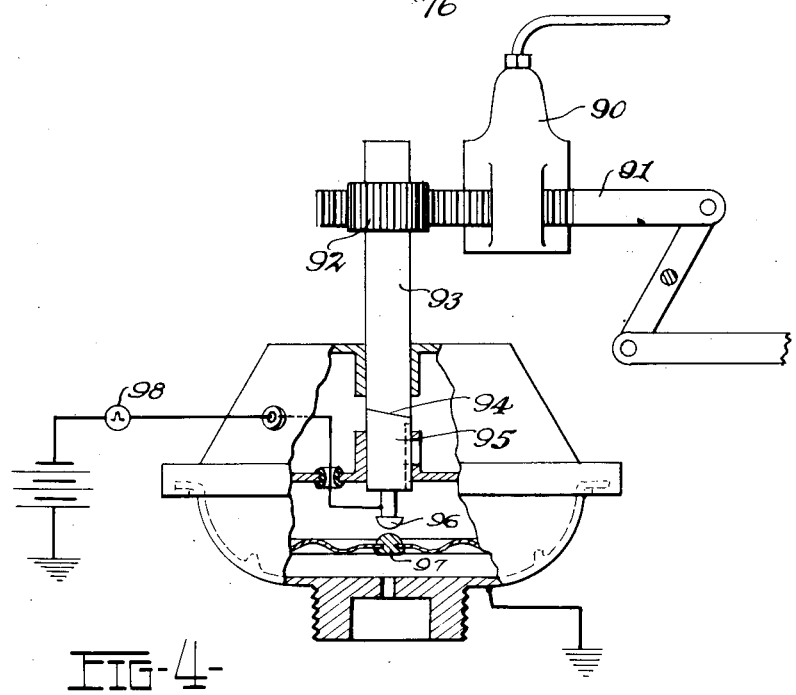
FIG-4-
INVENTOR.
THEODORE W. HALLERBERG
BY
ATTYS.

Patented Jan. 15, 1952

2,582,483

UNITED STATES PATENT OFFICE 2,582,483

PRESSURE SENSITIVE SWITCH

Theodore W. Hallerberg, Chicago, Ill.

Application March 13, 1947, Serial No. 734,295

1 Claim. (Cl. 200—83)

This invention relates to an operator for pressure indicators and is particularly directed to a device which is suitable for use in conjunction with an automotive vehicle engine.

It has heretofore been proposed to provide an On-Off electric indicator to be operated by oil pressure in an automotive or similar engine to inform the operator of an abnormally low oil pressure, continuance of which would be likely to cause damage to the engine. Prior devices with which I am familiar have failed to take into account the fact that there is a normal pressure fluctuation of oil pressure as the engine passes through its normal range of load and speed from idle to full operating speed, and that a dangerously low pressure at, for example, half load may represent a pressure which is perfectly normal and perfectly safe at no load and idle speed.

The primary object of the invention is to provide a pressure sensitive electric switch in which the operation is made dependent on a difference in pressure between two isolated chambers, each chamber pressure reflecting a separate engine condition.

Still another object of the invention is to provide a pressure sensitive electric switch in which one of a pair of cooperating contacts is moved by liquid pressure and the other contact of the pair is moved by thermal action which varies in intensity with engine speed.

Other objects and advantages of the invention will become apparent from the following specification, reference being had to the accompanying drawings showing two embodiments of the invention and in which:

Figure 1 is a side elevation of a vehicle engine with my pressure sensitive switch associated with its oil line; Fig. 2 is a central vertical sectional view of one form of pressure sensitive switch constructed in accordance with the present invention; Fig. 3 is a central vertical sectional view of a modified form of switch; and Fig. 4 is a diagrammatic view of a second modification.

Referring to the drawings and particularly to Fig. 1, the invention is shown applied to an internal combustion engine 10 having an intake manifold 12 and an oil line 14 in which lubricant under pressure of a pump 16 flows to the various engine parts. A generator 18 is mounted on the side of the engine and is customarily driven by a belt 20 from a fan shaft 22. The representation of the engine parts is diagrammatic since they form, per se, no part of the present invention.

A switch constructed in accordance with the present invention is indicated generally at 25 in Fig. 1 and is shown, in one form, in Fig. 2. A line 26 passes from the intake manifold 12 and is provided with a suitable detachable connector 27 at the switch body. Similarly a connection 28 is established between the switch body and the oil line 14. In Fig. 2 the switch body is designated 30 and preferably includes upper and lower sections separated by an air-tight diaphragm 32 fixed between the sections, or in any other manner so mounted as to form a chamber 33 the lower wall of which is defined by a second diaphragm 34.

The chamber 33 is put under the influence of the intake manifold pressure by connector 27 which enters a side of the chamber. The connector has a highly restricted orifice 35 at its inner end so that the pressure in chamber 33 follows the manifold pressure with some lag.

Diaphragm 34 forms, with the switch body, an oil chamber 36 into which connector 28 enters so that the chamber contains oil under full line pressure and as the pressure in the line 14 fluctuates, the pressure on diaphragm 34 changes. The diaphragm 34 is thus moved upwardly in response to an increase in oil pressure and downwardly in response to a decrease in pressure.

An electrical contact 38 is fixed at the center of diaphragm 34, the point of greatest motion, and is grounded through the body of the device since both body and diaphragm are preferably metallic. If a body of plastic or similar insulating material is used, a separate connection must, of course, be provided for contact 38.

A second contact 40 is carried by diaphragm 32 and is moved thereby toward and away from contact 38, a circuit being closed when the contacts are in engagement and open when the contacts are apart. Contact 40 preferably consists of a metallic member adjustably mounted in an insulating grommet 42 so that its initial position with respect to contact 38 can be changed, thus altering the conditions necessary to be established for closing of the circuit of which the contacts are part. Electrical connection to contact 40 is established in any suitable manner as by a flexible connection 44 the end of which is fixed to a threaded conducting stud 46 carried in an insulating bushing 48 and having a terminal nut 50 at its exposed end. A lamp 52 and battery 54 connected in series and to ground completes a simple indicator circuit which displays a light whenever the contacts 38 and 40 are closed and gives no indication when the contacts are open.

In operation, the electrical connections having been established to the indicator circuit, it is only necessary to establish manifold connection 27 and oil line pressure connection 28. As the engine operates the pressure chamber 33 follows the pressure of the intake manifold so that a vacuum in the manifold causes diaphragm 32 to move inwardly (the upper face of the diaphragm being subjected to atmospheric pressure). At the same time the oil pressure exerted on the lower face of diaphragm 34 moves this diaphragm upwardly. At idle speed the vacuum in chamber 33 is at a maximum and the oil pressure is at a minimum, while at higher speeds the vacuum is reduced and the oil pressure is increased.

Contacts 38 and 40 are so related that normal oil pressure and normal manifold pressure at part load operation will deform the two diaphragms 32 and 34 to such an extent that the contacts will be in engagement. Should, however, the oil pressure fall below a predetermined "normal" pressure, contact 38 will move downwardly and the indicator circuit will be broken unless contact 40 follows due to a higher vacuum in chamber 33. As a numerical example, 30 pounds pressure may be considered as the normal oil pressure when the engine is loaded, while a pressure as low as 5 pounds may be tolerated during idle speed, no load, conditions. The manifold vacuum, conversely, increases from perhaps 10 inches of mercury during part load operation to as much as 25 inches of mercury at idle operation. Thus, the contacts may be said to be held together by oil pressure when the engine is loaded and drawn together by vacuum at idle. During loaded operation if the oil pressure falls below that required to maintain the contacts together, the indicator circuit is broken. The device thus responds to the difference between two pressures each of which represents a different engine condition. The restriction in the passage to the intake manifold prevents the contacts from breaking if the engine throttle is suddenly opened, since there is a short interval during which the oil pressure will not have built up to its proper value. In the absence of this restriction indication of short duration would be given by lamp 52 which might be disturbing to an operator.

In the modification of the invention shown in Fig. 3, the pressure responsive chamber has been eliminated and the switch made sensitive to another engine condition which varies with engine speed. In this form the switch includes a bimetallic arm 60 surrounded by an electrically insulated heating coil 61 and pivoted at one end to an insulating bracket 62 carried by the switch body. The heating coil 61 is connected to the engine generator by connection A indicated in Fig. 1, one side of the circuit being, of course, grounded. A contact 63 is carried by the outer end of the bimetallic strip and is moved upwardly and downwardly in accordance with the heat of coil 61 which varies in intensity with the generator output. A cooperating contact 65 is mounted for movement by a diaphragm 66. The contact 65 is grounded through the metallic switch body, the ground being indicated diagrammatically.

Connection to the oil line in this modification is made through passage 74 which is restricted as at 76 so that rapid pressure fluctuations in the oil line do not immediately affect the pressure beneath diaphragm 66, which thus responds only to persistent trends or changes in oil pressure.

The indicating circuit as shown in this modification includes an indicating lamp 80 in series with a battery 81 and connected to the bimetallic strip 60 at its pivoted end. Resistor 82 is connected between the bimetallic element and ground so that the lamp glows continually displaying a subdued light. When contacts 63 and 65 are closed resistor 82 is shunted out of the circuit so that the lamp 80 then displays a bright light. The indicator circuit may be similar to that shown in my co-pending application Serial Number 734,294, now Patent Number 2,519,368, August 22, 1950, in which the circuit between certain contacts (in this case 63 and 65) is made and broken in response to an engine condition and may be used to operate the remainder of the elements there shown.

The operation in this modification is apparent from the above description from which it will be seen that operation of the engine generator heats coil 61 proportionally with its output so that when the generator output is low little heat is imparted to bimetallic strip 60 and a low oil pressure will serve to close the circuit between contacts 63 and 65. For a higher oil pressure, such as is necessary when the engine is operating under load, a higher heat is imparted to the bimetallic strip through its heating coil and contact 63 thus follows the upward movement of contact 65 caused by a properly high oil pressure. A bright light is displayed to the operator when the switch indicates the oil pressure to be proper for the load on the engine but a dim light is displayed whenever conditions are such that the oil pressure is not correct since the lower contact 65 will be unable to follow the upper contact. Lack of indication of the lamp 80 means simply that the lamp itself is burnt out and requires replacement. This same type of indication may, of course, be applied to the switch shown in Fig. 2.

In Fig. 4 I have shown the invention in a form applicable to compression ignition engines in which the intake manifold pressure is atmospheric or above. In this form operation of one of the switch contacts is made to vary with fuel pump setting which, of course, reflects directly the load on the engine and hence the desirable lubricant pressure. The fuel pump is indicated diagrammatically at 90 and may comprise the common "Bosch" type in which a rack 91 moves a piston positioning pinion within the pump to vary the discharge quantity at each stroke. This motion may conveniently be made to move a contact by any suitable device such as an auxiliary pinion 92 turning a shaft 93 the end of which forms a cam 94 cooperating with a second slidable shaft 95. The end of shaft 95 is so shaped that rotation of cam 94 causes reciprocation of any desired magnitude to be imparted to shaft 95.

A contact 96 moved by shaft 95 cooperates with a contact 97 moved by oil pressure to maintain a circuit closed through an indicating device such as lamp 98. It will be apparent that the oil pressure required to move the lower contact to circuit closing position depends on engine load as reflected in the setting of the fuel pump 90. At low loads a small pressure is sufficient, while as the load increases and the upper contact withdrawn, a greater oil pressure must be supplied if the indicating circuit is to remain closed.

While the invention has been disclosed in connection with three preferred embodiments it is apparent that numerous other modifications and changes may be made without departing from the invention as defined in the appended claims.

What I claim is:

A pressure sensitive electrical switch whose operation represents the combined effect of two distinct pressure conditions, which comprises a fluid tight casing, a pressure responsive diaphragm dividing the casing into two fluid compartments, a second pressure responsive diaphragm subdividing one compartment into fluid tight compartments, means for connecting the compartment between the diaphragms to one pressure condition, means for connecting the other compartment within the casing to a second pressure condition, a grounded contact carried by and moved by one diaphragm, and a second contact connected to a power source and carried by the other diaphragm in such relation to said first contact as to make and break a circuit therewith upon the occurrence of predetermined pressure differentials between the two pressure conditions.

THEODORE W. HALLERBERG.

REFERENCES CITED

The following references are of record in the file of this patent:

UNITED STATES PATENTS

| Number | Name | Date |
| --- | --- | --- |
| 1,444,403 | Varley | Feb. 6, 1923 |
| 1,456,663 | Willis | May 29, 1923 |
| 1,908,088 | Warner | May 9, 1933 |
| 2,086,264 | Gorschalki | July 6, 1937 |
| 2,149,068 | Paul et al. | Feb. 28, 1939 |
| 2,421,149 | Segerstad | May 27, 1947 |
| 2,450,961 | Heymann et al. | Oct. 12, 1948 |